United States Patent [19]

Hanagan

[11] Patent Number: 4,953,911
[45] Date of Patent: Sep. 4, 1990

[54] CONVERTIBLE SEAT FOR MOTORCYCLE

[75] Inventor: Michael W. Hanagan, San Jose, Calif.

[73] Assignee: Corbin Pacific, Watsonville, Calif.

[21] Appl. No.: 275,421

[22] Filed: Nov. 23, 1988

[51] Int. Cl.⁵ .............................................. B62J 1/00
[52] U.S. Cl. .................................. 297/195; 297/378; 297/DIG. 9
[58] Field of Search ................. 297/195, DIG. 9, 214, 297/243, 378; 180/219; 403/113, 117; 248/222.1, 291

[56] References Cited

U.S. PATENT DOCUMENTS

| | | | |
|---|---|---|---|
| 763,490 | 6/1904 | Jackley | 297/378 |
| 1,102,899 | 7/1914 | Fox . | |
| 1,442,772 | 1/1923 | Polhamus et al. | 297/378 |
| 2,697,776 | 12/1954 | Wale | 248/291 |
| 3,549,172 | 12/1970 | McBroom et al. | 297/243 |
| 3,625,405 | 12/1971 | Kezar . | |
| 3,822,917 | 7/1974 | Georg | 297/DIG. 9 |
| 3,887,231 | 6/1975 | Bochynsky | 297/DIG. 9 |
| 3,901,534 | 8/1975 | Popken | 297/DIG. 9 |
| 3,913,974 | 10/1975 | Bowen | 297/195 |
| 3,977,722 | 8/1976 | Gist | 297/378 |
| 4,030,750 | 6/1977 | Abram | 297/DIG. 9 |
| 4,313,639 | 2/1982 | Ware | 297/DIG. 9 |
| 4,440,330 | 4/1984 | Goodman . | |
| 4,570,998 | 2/1986 | Hughes . | |
| 4,679,647 | 7/1987 | Komura | 297/243 |
| 4,775,187 | 10/1988 | Herr | 297/378 |

FOREIGN PATENT DOCUMENTS 115469 12/1945 Sweden .

*Primary Examiner*—Peter R. Brown
*Assistant Examiner*—Brian K. Green

[57] ABSTRACT

A tandem motorcycle seat has a platform member for mounting upon the chassis, a tandem saddle providing a driver seat and a passenger seat, and a pivotable backrest pivoted on said platform member for pivoting between a position covering the passenger seat and an erected position providing a backrest for the passenger.

8 Claims, 4 Drawing Sheets

U.S. Patent    Sep. 4, 1990    Sheet 4 of 4    4,953,911
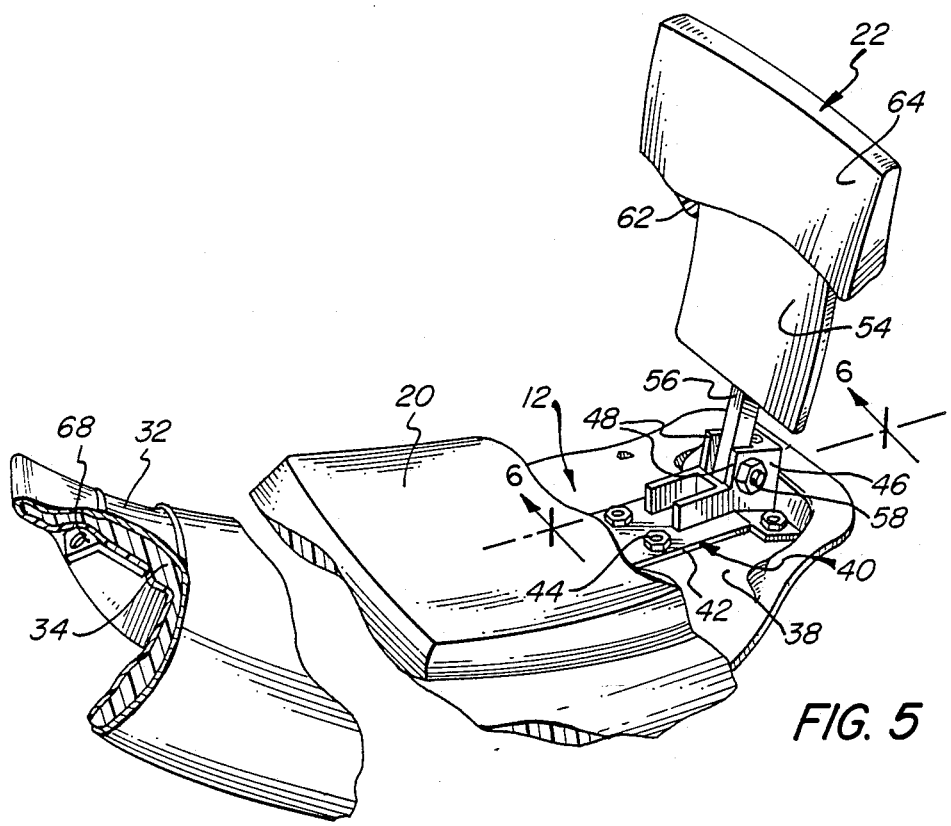
FIG. 5
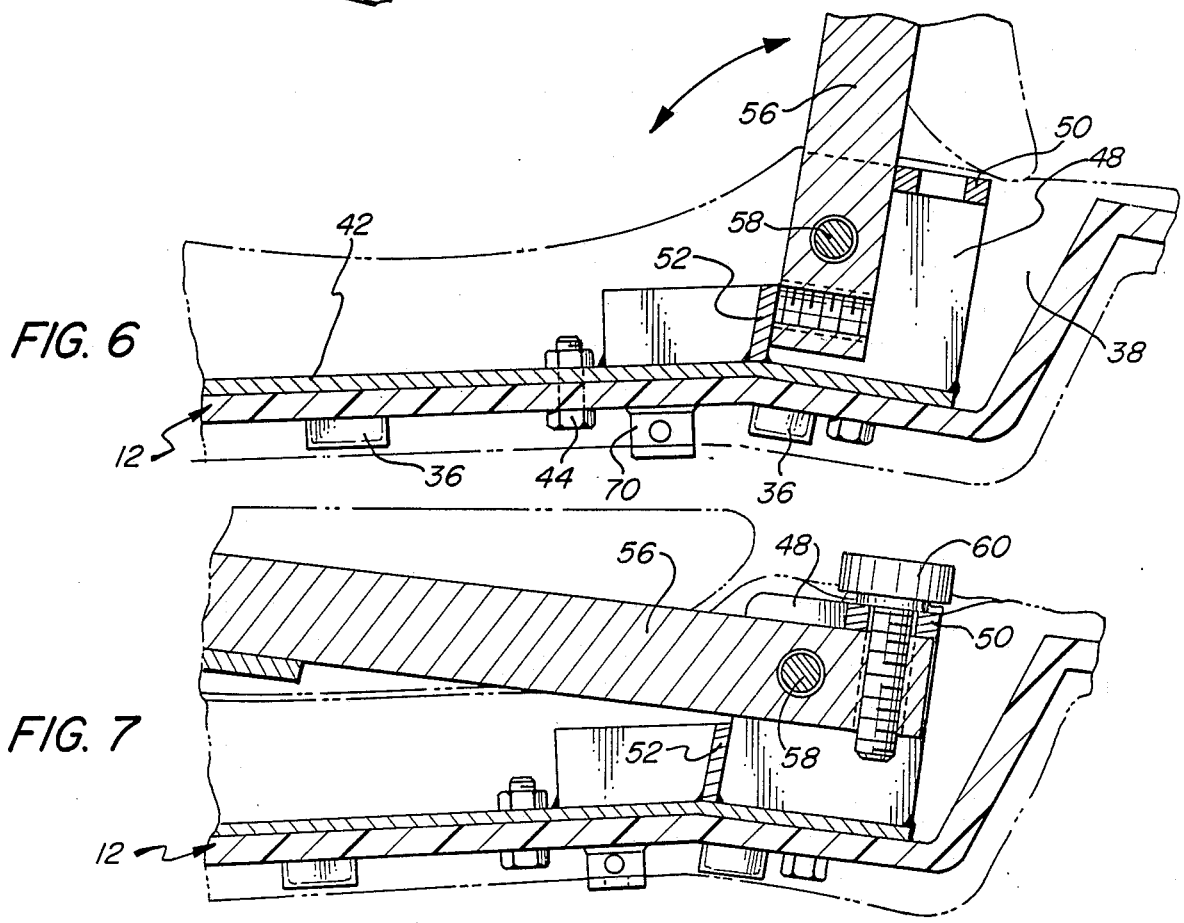
FIG. 6
FIG. 7

CONVERTIBLE SEAT FOR MOTORCYCLE

FIELD OF THE INVENTION

This invention relates to tandem motorcycle seats, and, more particularly, to such a seat which has a self-contained backrest for the passenger.

BACKGROUND OF THE INVENTION

Tandem motorcycle seats are well known and it has been proposed to provide such a seat in which a cover for the passenger seat portion pivots upwardly to become a backrest for the passenger. In U.S. Pat. No. 4,679,647, a backrest is pivotably hinged upon structural elements attached to the chassis. It will be appreciated that a pivotable cover/backrest will serve to keep the rear seat portion from becoming dirty and can improve the appearance from an aesthetic standpoint when no passenger is being carried. Moreover, providing a substantially flat top on the rear seat portion permits the transport of articles therein.

It is an object of the present invention to provide a novel and attractive tandem motorcycle seat having a cover for the passenger portion which may be pivoted upwardly to provide a backrest for the passenger.

It is also an object to provide such a seat which not only provides a streamlined appearance, but also is rugged in construction.

SUMMARY OF THE INVENTION

It has now been found that the foregoing and related objects may be readily attained in a unitary tandem motorcycle seat for attachment to the frame of a motorcycle and comprising a unitary rigid, elongated platform member configured to seat upon and be secured to the frame of the associated motorcycle for firm support thereby. A tandem saddle is disposed on the platform member and providing a driver seat portion and a passenger seat portion. A backrest for a person seated on the passenger seat is mounted on support means which pivotably mounts the backrest to the platform member adjacent the rear end of the saddle. The backrest is thereby movable between a substantially horizontal passenger seat covering position and an erected backrest position, and releasable locking means locks the support means to the platform member in the seat covering position.

Preferably, the support means includes a pivot base on the platform member providing horizontally spaced walls, and the backrest has a depending arm extending between the walls of the pivot base, and pivot means pivoting the arm on the pivot base. Desirably, the pivot base includes a stop for the arm when the backrest is in the erected position, and the arm has an end portion extending below the pivot means, and it abuts the stop in the seat covering position. The locking means extends through the stop and into the end portion of the pivot arm to lock the backrest in the passenger seat covering position.

Preferably, a second stop extends between the walls of the pivot member forwardly of the arm end portion and below the pivot means and the end portion of the pivot arm abuts the second stop, when the backrest is in its upright position to resist rearward pivotal motion of the arm portion. The backrest has a portion extending substantially over the arm and pivot base in the seat covering position, and the backrest and saddle are cooperatively dimensioned and contoured to substantially mate about the periphery of the backrest portion.

Most desirably, the platform member is sheet-like and formed to provide a recessed portion adjacent its rearward end in which the support means is disposed.

BRIEF DESCRIPTION OF THE DRAWINGS

FIG. 5 is a view similar to FIG. 4 but with elements partially cut away to show the pivotal support for the backrest;

FIG. 6 is a sectional view to an enlarged scale along the line 6—6 of FIG. 5; and FIG. 7 is a view similar to FIG. 6 but showing the backrest in the lowered position wherein it acts as a cover for the passenger seat.

DETAILED DESCRIPTION OF THE ILLUSTRATED EMBODIMENTS

Figure 1:
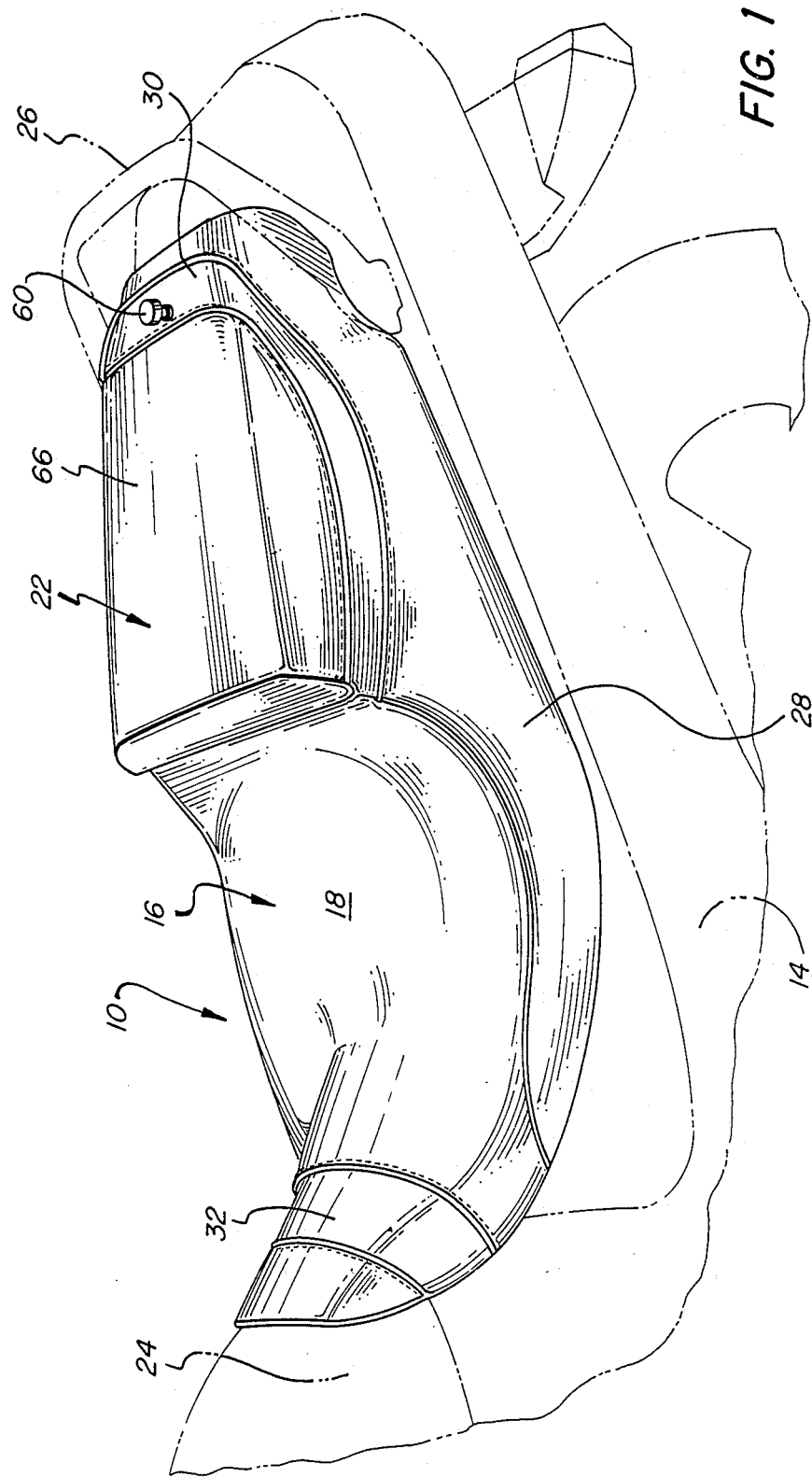
FIG. 1 is a perspective view of a tandem motorcycle seat embodying the invention as mounted upon a motorcycle fragmentarily illustrated in phantom line and with the backrest pivoted downwardly over the passenger seat portion.

Turning first to FIGS. 1-4, a motorcycle seat embodying the invention is generally designated by the numeral 10 and has a platform member or base generally designated by the numeral 12 secured to the frame or chassis 14 of the motorcycle shown in phantom line. Secured on the top surface of the platform member 12 is a contoured saddle generally designated by the numeral 16 which provides the forwardly disposed driver seat portion 18 and a rearwardly disposed passenger seat portion 20 (seen in FIG. 4).

Figure 2:
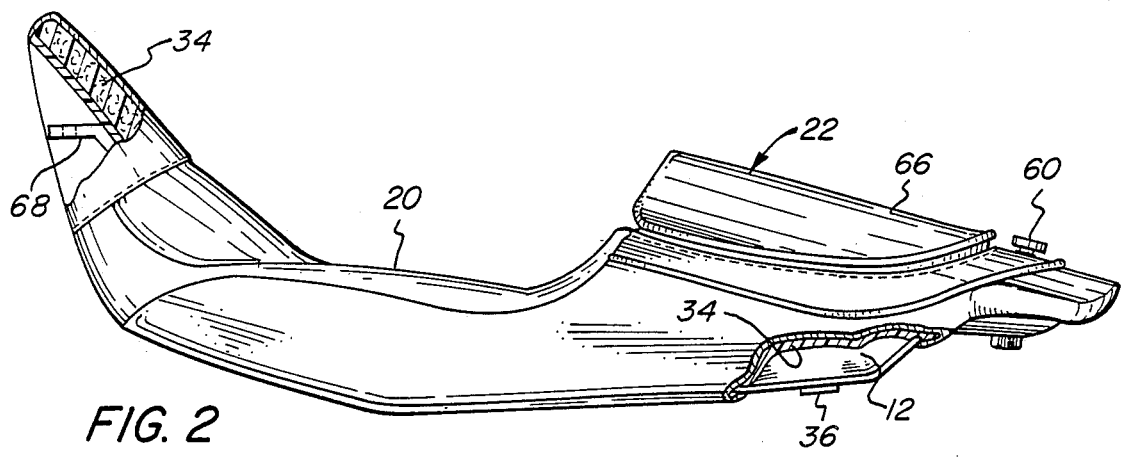
FIG. 2 is a side elevational view of the motorcycle seat with portions broken away to reveal underlying structure.
Figure 3:
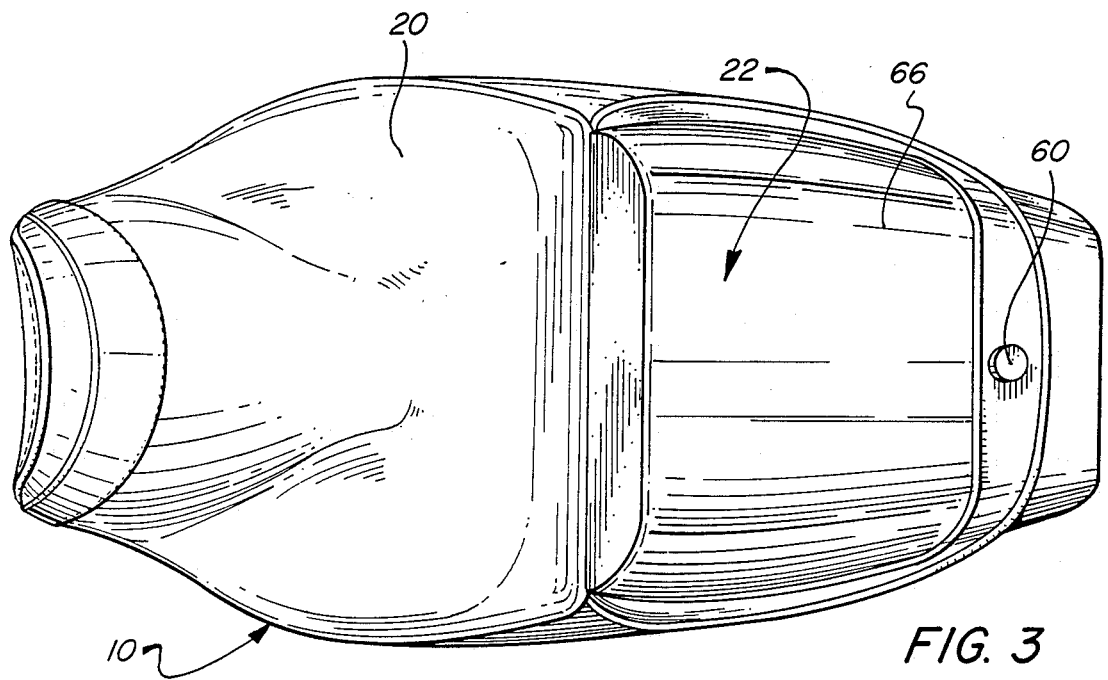
FIG. 3 is a top plan view of the motorcycle seat.
Figure 4:
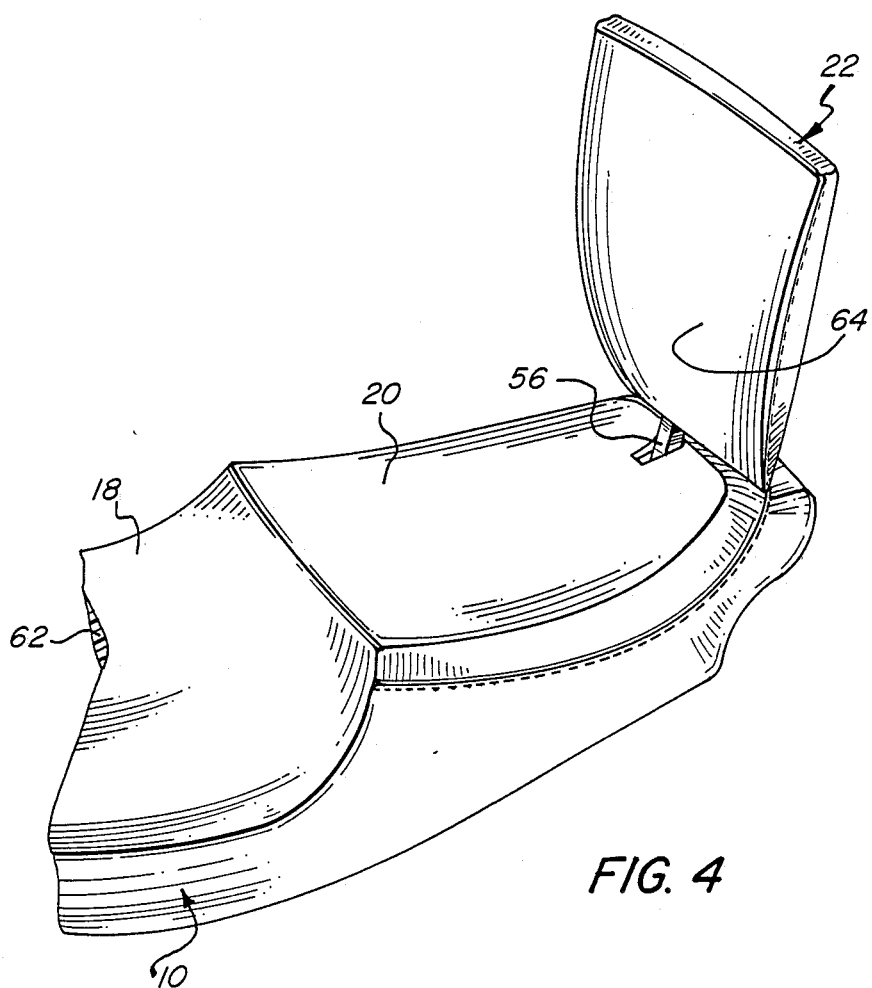
FIG. 4 is a fragmentary perspective view of the motorcycle seat showing the backrest raised into the operative backrest position.

In FIGS. 1-3, a backrest generally designated by the numeral 22 is shown in its lowered, passenger seat covering position and in FIG. 4 it is shown in its upright or erected backrest providing position.

The saddle 16 is upholstered and is contoured to have its periphery blend into the adjacent lines of the chassis 14 of the motorcycle. As shown, the seat 10 extends forwardly so that its forward end overlies the gasoline tank 24 of the motorcycle. As shown, the passenger seat portion 20 is elevated above the driver seat portion 18, and the seat 10 extends rearwardly to the handhold 26 above the rear wheel of the motorcycle.

To provide accents for its appearance, the saddle 16 has side panels 28 on either side thereof which are of a substantially smooth waterproof material such as vinyl. An accent strip 30 extends around the sides of backrest 22, and it may be the same color as an accent strip 32 adjacent the forward end of the seat 10. The covering for the upper surface of the saddle 16 may be textured or smooth. Beneath the covering comprising the outer surface of the saddle 16 is padding 34 which serves to provide comfort of the rider(s). This padding 34 may be foamed resin or any other resiliently deformable material.

Turning now to FIGS. 5-7, the base or platform member 12 is conveniently formed from molded fiberglass reinforced resin or stamped metal, and it is contoured to closely fit or wrap about the chassis and components of a particular motorcycle upon which it is to be mounted. The platform member 12 has conventional mounting elements 68,70 on the bottom surface thereof which mate with cooperating retainers (not shown) on the motorcycle chassis to secure it thereto. Desirably, the platform member 12 has resilient feet 36 spaced thereabout, which support the platform member 12 upon the motorcycle frame 14.

As best seen in FIGS. 5-7, the platform member or base 12 has a recess 38 adjacent the rearward end thereof and spaced inwardly from its side margins and generally centrally thereof. Secured in this recess 38 is a support assembly generally designated by the numeral 40 which includes an elongated bottom member 42 secured to platform member 12 by a plurality of fasteners 44. Extending upwardly from the bottom member 42 is a pivot base 46 having spaced apart side walls 48. A stop bar 50 extends across the top of the side walls 48 adjacent their rearward end, and a stop bar 52 extends across the side walls 48 at their forward end adjacent the bottom member 42.

The backrest 22 has a rigid body member 54 which is secured to a rigid pivot arm 56 spaced substantially inwardly from the side margins and generally centrally thereof of the rigid body member, and the pivot arm 56 extends between the side walls 48 of the pivot base 46. A pivot pin 58 extends through the pivot arm 56 and is journalled in the side walls 48. In the erected or upright position of the backrest 22 seen in FIGS. 4-6, the lower end of the pivot arm 56 abuts the stop bar 52, and the pivot arm 56 also abuts the stop bar 50, thus resisting rearward movement. In the downward or closed position seen in FIGS. 1-3 and 7, a lock bolt 60 extends through the stop bar 50 and into a threaded aperture in the pivot arm 56 to prevent its pivotal movement. As seen in FIGS. 1-3, the saddle 16 is configured so that a portion thereof overlies the rearward portion of the pivot base 46, and the lock bolt 60 extends downwardly through the overlying portion.

The backrest 22 has resiliently deformable padding 62 on the front surface of the body member 54 and a fabric covering 64 thereover, and it has a cover 66 on the rear surface thereof. The front surface of the cover 22 is contoured to mate with the upper surface of the passenger portion 20 of the seat 10 to provide an essentially flush appearance. The padding 62, and covering 64 and cover 66 taper rearwardly downwardly at the lower end of the backrest 22 so as to cover substantially the pivot arm 56 and to mate closely with the adjacent portion of the saddle 16 in the closed position.

Thus, the described construction provides a tandem motorcycle seat with pivoted backrest/cover where the hinging and support mechanism for the backrest is built into the seat and hidden from view. There are no external brackets or supports required for the backrest 22 to be in the elevated, backrest position.

The back cover 66 of the backrest 22 is a waterproof wear-resistant material such as vinyl while the backrest fabric covering 64 will normally be the same or complimentary to the covering of the saddle 16. As shown in FIGS. 1-3, when in the seat covering position, the backrest 22 forms part of the outline of the overall seat to provide a pleasing, aesthetic appearance.

In the present invention, there are no exterior structural members having portions extending on both sides of the motorcycle to support the passenger backrest and the pivot arm and pivot base are both substantially concealed in the closed position of the backrest. The disclosed structure permits the periphery of the tandem seat to fit closely the chassis of the motorcycle. The entire tandem seat assembly of the present invention is mounted upon or removed from a motorcycle as a unit.

When only a single rider is on the motorcycle, the backrest 22 is secured in a position to cover the passenger seat 20 by the lock bolt 60 which is threaded into the lower end of pivot arm 56. When there is a passenger, the bolt 60 is removed, and the backrest 22 is pivoted to the position shown in FIG. 4.

Thus, it can be seen that the seat of the present invention is highly attractive and provides a firm backrest for a passenger when elevated. The backrest folds down to cover the passenger seat and is easily locked in that position to provide an attractive, streamlined appearance. The backrest is firmly mounted with the platform or base of the seat to provide a rugged assembly.

Having thus described the invention, what is claimed is:

1. A unitary tandem motorcycle seat for attachment to the frame of a motorcycle comprising a unitized assembly of:
    (a) a unitary rigid, elongated platform member having side margins and configured to seat upon and be secured to the frame of the associated motorcycle for firm support thereby, said platform member having mounting means on its lower surface and spaced inwardly of the side margins thereof for engagement to the frame and adapted to be substantially concealed when the seat is mounted on the motorcycle;
    (b) an elongated tandem saddle on said platform member providing a driver seat portion at its front end and a passenger seat portion at its rear end, said saddle having side margins;
    (c) a backrest for a person seated on said passenger seat and having a depending arm spaced inwardly from the side margins of said saddle, said backrest having side margins;
    (d) support means on said platform member pivotably mounting said backrest arm to said platform member adjacent the rear end of said saddle, said support means being spaced inwardly from the side margins of said backrest and saddle and being disposed below an adjacent upper surface of said saddle, whereby said backrest is movable between a substantially horizontal passenger seat covering position and an erected backrest position, said support means and a portion of said arm of said backrest being disposed below an upper surface of said backrest and saddle so as to be substantially concealed upon pivoting of said backrest into its seat covering position; and
    (e) cooperating releasable locking means on said support means and said backrest, said locking means being spaced inwardly from the side margins of said backrest and saddle for locking said backrest to said platform member in said seat covering position, said mounting means, said support means and a portion of said depending arm all being spaced below said backrest and saddle so as to be concealed when said backrest is in said seat covering position.

2. The seat of claim 1 wherein said support means includes a pivot base element on said platform member having walls spaced apart transversely of said platform member, said backrest depending arm extending between said walls of said pivot base element, and pivot means pivotably mounting said arm on said walls of said pivot base element.

3. The seat of claim 2 wherein said pivot base element includes a first stop for said pivotally mounted arm of said backrest when said backrest is in the erected position.

4. The seat of claim 2 wherein said backrest has a portion extending substantially over said arm and pivot base element in the backrest erected position, said backrest and saddle being cooperatively dimensioned and contoured to substantially mate about the periphery of said backrest portion and conceal substantially said depending arm, support means and locking means.

5. The seat of claim 1 wherein said platform member is generally of sheet-like form with a recessed portion adjacent its rearward end in which said support means is disposed.

6. The seat of claim 2 wherein said platform member is generally of sheet-like form with a recessed portion adjacent its rearward end, said pivot base element being disposed in said recessed portion.

7. A unitary tandem motorcycle seat for attachment to the frame of a motorcycle comprising a unitized assembly of:
   (a) a unitary rigid, elongated platform member configured to seat upon and be secured to the frame of the associated motorcycle for firm support thereby;
   (b) an elongated tandem saddle on said platform member providing a driver seat portion at its front end and a passenger seat portion at its rear end, said passenger seat portion having side margins;
   (c) a backrest for a person seated on said passenger seat portion and having a depending arm spaced inwardly from the side margins of said passenger seat portion, said backrest having side margins;
   (d) support means on said platform member pivotably mounting said backrest arm to said platform member adjacent the rear end of said saddle, said support means being spaced inwardly from the side margins of said backrest and saddle said support means including a pivot base on said platform member providing horizontally spaced walls, said backrest depending arm extending between said walls of said pivot base, and pivot means pivoting said arm on said pivot base, said pivot base including a first stop for said pivotally mounted arm of said backrest when said backrest is in the erected position, whereby said backrest is movable between a substantially horizontal passenger seat covering position and an erected backrest position, said support means and said arm of said backrest being disposed below an upper surface of said backrest and saddle so as to be substantially concealed upon pivoting of said backrest into its seat covering position; and
   (e) cooperating releasable locking means on said support means and said backrest, said locking means being inwardly from the side margins of said backrest and saddle for locking said backrest to said platform member in said seat covering position, said pivot arm having an end portion extending below said pivot means, said end portion abutting said stop in said seat covering position, and said locking means extending through said first stop and into said end portion of said arm to lock said backrest in said passenger seat covering position.

8. The seat of claim 7 further including a second stop extending between said walls of said base element forwardly of said arm end portion and below said pivot means, said end portion of said arm abutting said second stop when said backrest is in its erected position to resist rearward pivotal motion of said arm.

* * * * *